(12) United States Patent
Voigt et al.

(10) Patent No.: US 7,417,793 B2
(45) Date of Patent: Aug. 26, 2008

(54) STRUCTURE FOR SUPPORTING AN OPTICAL TELESCOPE

(76) Inventors: Che Ram Souza Voigt, 505 Divisadero St., #B2, San Francisco, CA (US) 94117; Allan Alfred Voigt, 400 Breezewood Dr., Geyserville, CA (US) 95441; John Mark Speicher, 133 Rossi, Geyserville, CA (US) 95441; Chet Alister Johnston, 536 Spencer Ave., Santa Rosa, CA (US) 95404

( * ) Notice: Subject to any disclaimer, the term of this patent is extended or adjusted under 35 U.S.C. 154(b) by 0 days.

(21) Appl. No.: 11/341,109

(22) Filed: Jan. 28, 2006

(65) Prior Publication Data

US 2006/0158723 A1 Jul. 20, 2006

Related U.S. Application Data

(62) Division of application No. 10/763,297, filed on Jan. 21, 2004, now Pat. No. 7,023,615.

(51) Int. Cl.
*G02B 23/08* (2006.01)
*G02B 23/22* (2006.01)

(52) U.S. Cl. .................... 359/405; 359/366; 359/399

(58) Field of Classification Search ......... 359/364–366, 359/399, 405, 406, 430, 871–879
See application file for complete search history.

(56) References Cited

U.S. PATENT DOCUMENTS

| 3,702,477 A * | 11/1972 | Brown ................. 342/451 |
| 5,008,606 A * | 4/1991 | Koehler et al. ........ 318/649 |
| 6,124,968 A * | 9/2000 | Pieri et al. ............ 359/405 |
| 2002/0104927 A1* | 8/2002 | Pedreiro .............. 244/158 R |

* cited by examiner

*Primary Examiner*—Joshua L Pritchett
(74) *Attorney, Agent, or Firm*—Risto A. Rinne, Jr.

(57) ABSTRACT

An apparatus for the focusing of incident light includes a base assembly that is adapted to support a primary mirror. The primary mirror includes an outside circumference and an inside aperture. An upright member is attached to the base assembly at a first end thereof at a first location that is disposed inside the aperture and at a second location that is disposed outside the primary mirror. The upright member includes a second end that is distally disposed with respect to the first end. The second end is adapted to receive a turret that includes a secondary mirror and is adapted to pivot between two positions. An IMU is attached to the base assembly proximate the primary mirror.

3 Claims, 7 Drawing Sheets

STRUCTURE FOR SUPPORTING AN OPTICAL TELESCOPE

BACKGROUND OF THE INVENTION

1. Field of the Invention

The present invention, in general relates to telescopes and, more particularly, to a variable field of view telescope that is adapted for simultaneous use with visible and infrared wavelengths.

Cassegrain types of telescopes are well known reflector-types of telescopes that are used in both the recreational arts for astronomy and ground observation and also for commercial purposes as well as for certain military applications. In general, they offer a longer focal length in a more compact package. It is desirable with all optical systems to obtain as much light energy as possible (i.e., to provide a large aperture) in as compact and rigid a structure as is possible.

Variable field of view telescopes that include a plurality of field of view optical groups for insertion into the optical path are also known. The known prior art devices utilize a "C" structure that extends in an arc from the base of a primary mirror to a position over the primary mirror. A turret attached to the upper end of the C structure is used to suspend the plurality of optical groups a predetermined distance over the primary mirror.

The plurality of optical groups that are disposed on the turret are arranged for sequential insertion of one group into the field of view following the simultaneous withdrawal of a preceding group from the field of view. Accordingly, one optical group is always disposed in the field of view.

While providing the benefit of being able to withdraw and then insert one of several optical groups into the field of view (to affect the field of view), there are several disadvantages inherent with this type of design. An important disadvantage is that the C structure incurs considerable flexing that is an inherent characteristic due to the length of the arm and the fact that it is supported only at the base of the structure.

This can cause misalignment of the optical groups and resultant distortion in the optical path. Also, because of the long length of the C structure, thermal expansion and contraction effects can further contribute to misalignment and error along the optical path or limit the temperature range in which the equipment can properly function.

Also, the C structure obstructs a significant quantity of light energy that would otherwise impede upon the primary mirror. The C structure provides only one point of mechanical support. Therefore, it must be mechanically large and strong enough so as to sufficiently limit flexing and vibration. Because the structure is supported on the outside of the primary mirror, a long moment arm is also created from the base of the C structure to the turret. It is the long moment arm that is subject to flexing and the turret that is subject to vibration.

Vibration can be in response to any mechanical energy that the C structure experiences. For example, vibration of the engine(s) that propel the vehicle or aircraft may be transmitted to the C structure. While there is always the possibility for vibration of the moment arm, there is also the possibility that the length of the arm can resonate in a harmonic frequency thereby increasing the amplitude of vibration.

To minimize flexing and vibration an amount that permits utilization of the C structure design, it is built as large and as strong as it needs to be in order to function in any given environment. However, this is not desirable because it is preferable that the C structure be as small as possible so as to minimize the amount of light energy that it obstructs. Accordingly, a tradeoff is made in the prior art design that sacrifices light gathering ability for necessary rigidity.

Also, the larger the C structure is, the heavier it also becomes. This is another limitation that is an especially important consideration in various circumstances, for example, when the telescope is used in an aircraft or spacecraft. While it is desirable that a telescope be lightweight, this is crucial in certain applications.

The prior art design also relies upon the use of moveable hard stops to repeat the position that the plurality of optical groups are maintained in. This limits the speed by which optical groups can be changed without causing damage.

Furthermore, when the plurality of optical groups are moved into and out of the optical path, it is desirable that precise repeatability of their position occur, else the optical path is adversely affected. The prior art designs that require variability in the stops are unable to provide optimum repeatability in the positioning of the optical groups.

An especially significant limitation with the prior art designs is that the field of view changes in steps according to the number and optical characteristics of the various optical groups. It is desirable to be able to step in IR and also to provide a progressive zoom capability in visible as well, which the prior art fails to provide.

The prior art designs are also limited in their ability to provide both IR (infrared) and visible light gathering ability. Separate optical paths are typically required. If the telescope is used in a gimbal ball, for example, this would result in having two apertures in the gimbal ball, one for visible and one for IR. This is undesirable for many reasons.

There are many light frequencies that may be of interest. It is desirable to be able to view two or more channels simultaneously and also to change the field of view (FOV) from between wide angle FOV (lower magnification) and narrow FOV (higher magnification) capabilities. Prior art designs have been unable to effectively switch back and forth between infrared and visible light while also providing a zoom capability.

For many applications it is desirable to be able to zoom in the visible spectrum. For example, if after detecting an object of interest using a wide field of view (in the visible spectrum or IR spectrum), it is desirable to be able to narrow the field of view and zoom in to obtain a closer examination of the object. If the object of interest was first discovered as a presence in the infrared spectrum, it may be desirable to switch study to the visible spectrum and zoom in accordingly.

Prior art designs have provided limited zoom capability in the visible spectrum. This is because a rigid and relatively long physical path is required to house the optical elements that typically accompany an optical zoom system. A recording camera or other type of transducer may be placed in the field of view, as desired.

Furthermore, space is often a commodity in short supply, especially if the telescope is to be housed in a gimbal ball.

Accordingly, it is desirable to be able to provide a space to accommodate the optical elements of a visible zoom optical system and do so in such manner as to provide an optimally long linear path that is especially rigid. It would also be a significant and unexpected benefit if the structures used for the visible optical zoom system were able to provide increased rigidity to the overall structure for supporting an optical telescope.

As mentioned briefly hereinabove, there are many possible frequencies of light (electromagnetic) energy that may of interest depending upon the application. It is desirable to provide versatility in such an instrument to change the transducers and analyze the relevant spectrums that may be of interest.

Another prior art limitation concerns the mounting of the gyroscope that is used to determine position of the primary mirror. As the primary mirror is used in long focal length (i.e., high magnification) applications, its positioning is of critical concern.

Prior art designs have included the gyroscope inside of the gimbal ball, for example, but the gyroscope has been positioned distally away from the primary mirror. A number of support structures exist in prior art designs that are disposed intermediate the primary mirror and the gyroscope. Tolerances, vibration, expansion and contraction, all combine to introduce a potential for error occurring between the actual position of the primary mirror and where the gyroscope "thinks" it is pointing.

It is desirable to limit such error to an absolute minimum. Positioning data may be obtained from GPS (global positioning satellite) data. An IMU or an inertial measurement unit includes a combination of three rate instruments and three accelerometers. The preferred type of rate instruments include fiber optic gyroscopes (FOG). Typically, IMUs are used to calculate changes in direction as well as position information by measuring outputs from the FOGs and accelerometers. Accordingly, motion in all directions is accounted for. When GPS data is combined with IMU output and computer circuits are utilized (to provide a corrective signal), and Inertial Navigation System (INS) is provided.

Accordingly, the ability of the INS to correct for changes in position (for example, of the aircraft) and to maintain the primary mirror pointing precisely on an object of interest, especially at long focal lengths, is dependent upon how accurately the direction in which the primary mirror is pointing is known.

If the distance between the primary mirror and the IMU introduces a variable then the IMU's output is subject because it indicates changes in the IMU's position which do not correlate one to one with changes in the primary mirror's position.

Accordingly, it is especially desirable to reduce error between the output of the IMU and the actual direction the primary mirror is oriented.

Accordingly, there exists today a need for a structure for supporting an optical telescope that overcomes these prior art limitations.

2. Description of Prior Art

Telescopes and zoom lenses are, in general, known. For example, the following patent describes various types of these devices:

U.S. Pat. No. 5,907,433 to Voigt et al, May 25, 1999; and
U.S. Pat. No. 5,940,222 to Sinclair et al, Aug. 17, 1999.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a structure for supporting an optical telescope that provides a large aperture telescope.

It is also an important object of the invention to provide a structure for supporting an optical telescope that includes an IMU that is attached to a base structure that directly supports a primary mirror.

It is a significant object of the invention to provide a structure for supporting an optical telescope that includes a support structure that is adapted to suspend an optical group over a primary mirror in which the support structure includes three points of mechanical support.

It is a continuing significant object of the invention to provide a structure for supporting an optical telescope that includes a support structure that is adapted to suspend an optical group over a primary mirror in which the support structure includes three points of mechanical support, one of the three points being disposed within an aperture of the primary mirror and the remaining two points being disposed distally away from each other and outside of the circumference of the primary mirror.

It is a further significant object of the invention to provide a structure for supporting an optical telescope that includes a support structure that is adapted to suspend an optical group over a primary mirror in which the support structure forms a tripod.

It is a still further significant object of the invention to provide a structure for supporting an optical telescope that includes a support structure that is adapted to suspend an optical group over a primary mirror in which the support structure includes a tripod having three points of mechanical support, one of the three points being disposed within an aperture of the primary mirror and the remaining two points being disposed distally away from each other and outside of the circumference of the primary mirror and wherein the tripod includes an upright member that is disposed outside of the circumference of the primary mirror and which does not obstruct incident light from striking the primary mirror and wherein the upright member includes a portion having a linear length and wherein the linear length approaches in magnitude the distance that the optical group is disposed above a portion of the primary mirror.

Another object of the invention is to provide a structure for supporting an optical telescope that is compact and especially rigid.

Still another object of the invention is to provide a structure for supporting an optical telescope that obstructs a minimum of the surface area of a primary mirror.

Still yet another important object of the invention is to provide a structure for supporting an optical telescope that obstructs a minimum of the surface area of a primary mirror when the telescope is adapted for viewing in a long focal length.

Still yet another object of the invention is to provide a structure for supporting an optical telescope that includes a simultaneous dual optical path.

Yet another important object of the invention is to provide a structure for supporting an optical telescope that includes a first optical path that passes through an aperture in a primary mirror when a secondary mirror is positioned over the primary mirror in the field of view and a simultaneous second optical path that does not pass through an aperture in a primary mirror.

Yet another especially important object of the invention is to provide a structure for supporting an optical telescope that includes a first optical path that passes through an aperture in a primary mirror when a secondary mirror is positioned over the primary mirror in the field of view and a simultaneous second optical path that does not pass through the aperture in the primary mirror and, instead, passes through an aperture in the secondary mirror.

Still yet another valuable and important object of the invention is to provide a structure for supporting an optical telescope that allows for simultaneous viewing of visible and IR (infrared) wavelengths.

Still one further important object of the invention is to provide a structure for supporting an optical telescope that includes a circular primary mirror with an aperture in the center thereof.

Still yet one additional important object of the invention is to provide a structure for supporting an optical telescope that allows for the use of a dichroic beam splitter that directs longer wavelengths of light in a first direction along a first optical path and shorter wavelengths of light in a second direction along a second optical path.

A valuable object of the invention is to provide a structure for supporting an optical telescope that is adapted to support an optical grouping that can simultaneously provide a change in the field of view (FOV) in both IR and visible wavelengths.

A further valuable object of the invention is to provide a structure for supporting an optical telescope that is adapted to support an optical grouping that can simultaneously provide a stepped change in the field of view (FOV) in an IR spectrum and a zoom change in the FOV in a visible spectrum.

A first continuing object of the invention is to provide a structure for supporting an optical telescope that is adapted to suspend an optical group over a primary mirror and that is as small and light in weight as possible.

A second continuing object of the invention is to provide a structure for supporting an optical telescope that is adapted to suspend an optical group over a primary mirror while blocking a minimum of area of the primary mirror when viewing at longer focal lengths.

A third continuing object of the invention is to provide a structure for supporting an optical telescope that includes a support structure that is adapted to support an optical group above the primary mirror in the field of view and wherein the support structure includes at least two points of mechanical support.

A fourth continuing object of the invention is to provide a structure for supporting an optical telescope that includes a support structure that is adapted to support an optical group above a primary mirror in the field of view and wherein the support structure includes a first point of mechanical support at a bottom of the support structure and a second point of mechanical support at an opposite side of the bottom of the support structure.

A fifth continuing object of the invention is to provide a structure for supporting an optical telescope that includes a support structure that is adapted to support an optical group above a primary mirror in the field of view and wherein the support structure includes a first point of mechanical support at a bottom of the support structure and disposed outside of an exterior circumference of the primary mirror and a second point of mechanical support at the bottom of the support structure and disposed though an opening that is provided in the primary mirror and which is disposed within the circumference of the primary mirror.

A sixth continuing object of the invention is to provide a structure for supporting an optical telescope that includes a support structure that is adapted to support an optical group above a primary mirror in the field of view and wherein the support structure includes a first point of mechanical support at a bottom of the support structure and disposed outside of an exterior circumference of the primary mirror and wherein the primary mirror includes a center aperture that includes a second inner circumference and wherein the support structure includes a second point of mechanical support at the bottom of the support structure that is disposed inside of the second inner circumference.

A seventh continuing object of the invention is to provide a structure for supporting an optical telescope that provides support for a turret that either places or removes one optical group into the optical path, and when the optical group is removed from the optical path it provides no interference to the then current field of view.

An eighth continuing object of the invention is to provide a structure for supporting an optical telescope that provides support for a turret that either places or removes one optical group into the optical path, and when the optical group is removed from the optical path neither any portion of the turret or of the one optical group interferes with the then current field of view.

A ninth continuing object of the invention is to provide a structure for supporting an optical telescope that provides support for a turret that either places or removes one optical group into the optical path, and when the optical group is removed from the optical path neither any portion of the turret nor of the one optical group impedes the incident light energy that the optical system is adapted to utilize.

A tenth continuing object of the invention is to provide a structure for supporting an optical telescope that provides a support member for an optical group, the support member being secured at two points to a base structure, the base structure adapted to support a primary mirror that includes an aperture, one of the two points being disposed in the aperture, the remaining one of the two points being disposed outside of the aperture.

An eleventh continuing object of the invention is to provide a structure for supporting an optical telescope that provides a first change in magnification of approximately four to six times.

A twelfth continuing object of the invention is to provide a structure for supporting an optical telescope that provides a second change in magnification of approximately four to six times.

A thirteenth continuing object of the invention is to provide a structure for supporting an optical telescope that provides a first change in magnification of approximately four to six times and a second change in magnification of approximately four to six times resulting in a total range of magnification (i.e., zoom capability) of approximately sixteen to thirty-six times.

A fourteenth continuing object of the invention is to provide a structure for supporting an optical telescope that provides a first change in magnification that removes or inserts an optical group into or out of the field of view, the resultant change in the optical group providing a step change in magnification of approximately four to six times.

A fifteenth continuing object of the invention is to provide a structure for supporting an optical telescope that provides a second change in magnification that progressively changes at least one lens in an optical group, the resultant change in the optical group providing a progressive change in magnification of approximately four to six times.

A sixteenth continuing object of the invention is to provide a structure for supporting an optical telescope that provides a first change in magnification that removes or inserts an optical group into or out of the field of view, the resultant change in the optical group providing a step change in magnification of approximately four to six times and which provides capability for a second change in magnification that progressively changes at least one lens in an optical group, the resultant change in the optical group providing a progressive change in magnification of approximately four to six times, which when combined, can provide a variable range of magnification (i.e., zoom) of approximately thirty-six times.

A seventeenth continuing object of the invention is to provide a structure for supporting an optical telescope that provides an optical group of lenses disposed along an outer edge of an upright member in a linear arrangement.

An eighteenth continuing object of the invention is to provide a structure for supporting an optical telescope that provides an optical group of lenses disposed along an outer edge of an upright member in a linear arrangement, the optical group of lenses providing a progressive zoom capability.

A nineteenth continuing object of the invention is to provide a structure for supporting an optical telescope that provides an optical group of lenses disposed along an outer edge of an upright member in a linear arrangement, the optical group of lenses providing a location and capability for placement of any desired transducer that is adapted for the study of any desired optical channel (i.e., wavelength).

A twentieth continuing object of the invention is to provide a structure for supporting an optical telescope that includes a primary optical element with a center circular aperture and wherein the structure includes a support ring that has a diameter that is more than that of the center circular aperture and wherein the support ring extends around the center aperture and wherein the primary optical element is attached to the support ring.

A twenty-first continuing object of the invention is to provide a structure for supporting an optical telescope that provides both IR (infrared) and visible light gathering ability at a longer focal length of each which share a portion of a first primary optical path until each are reflected off of a primary mirror.

A twenty-second continuing object of the invention is to provide a structure for supporting an optical telescope that includes an IR optical path that extends below an aperture of a primary mirror and wherein the structure provides support for changing optical elements that extend below the plane of the primary mirror.

A twenty-third continuing object of the invention is to provide a structure for supporting an optical telescope that includes an IR optical path that extends below an aperture of a primary mirror and wherein the structure provides support for changing optical elements that extend below the plane of the primary mirror so that a converging bundle of IR below the primary mirror includes a low f-number (i.e., a high density of IR energy).

A twenty-fourth continuing object of the invention is to provide a structure for supporting an optical telescope that includes an IR optical path that extends below an aperture of a primary mirror and wherein the structure provides support for a drive shaft that passes through a portion of an upright member, wherein the drive shaft is adapted to change the position of a plurality of optical elements along the IR optical path.

Briefly, a structure for supporting an optical telescope that is constructed in accordance with the principles of the present invention has a base assembly that supports a primary mirror. An upright member is attached at a first end thereof to the base assembly and extends upward from the primary mirror. The first end of the upright member is attached to the base assembly at a first location that is disposed within an aperture provided in the primary mirror. An intermediate center section of the first end of the upright member is disposed above the primary mirror and extends to an outside edge of the primary mirror where it is attached to the base assembly at a second location that is past an outside edge (circumference) of the primary mirror. The second location preferably includes two distal points of attachment, each beyond the outside edge of the primary mirror, thereby providing a total of three points of attachment of the first end of the upright member to the base assembly. A turret structure is disposed at a second end of the upright member and is adapted to pivot a secondary mirror in and out of position over the primary mirror. When the secondary mirror is disposed over the primary mirror a first primary optical path is provided. A beam splitter is provided which splits the first primary optical path into two secondary optical paths, allowing simultaneous viewing of at least two wavelengths. A first of the two secondary optical paths includes a longer wavelength of light that is directed through the beam splitter and through the center aperture of the primary mirror. A second of the two secondary optical paths includes a shorter wavelength of light that is reflected off of the beam splitter and passes through a second center aperture of the secondary mirror. Other optical groups disposed along the two paths are used to direct, focus, analyze, shape, and record the respective images, as desired. When the pivoting turret structure is used to pivot the secondary mirror out of the optical path and generally away from a center longitudinal axis of the primary mirror, a second primary optical path is provided that includes a shorter focal length (i.e., a wider field of view or FOV). The shorter focal length of the second primary optical path preferably includes a lessening in magnification by a factor of approximately four to six times less magnification than a longer focal length of the first primary optical path. Other optical groups are preferably also adapted to affect (i.e., via a zoom capability or a further changing of optical groups) the magnification of the optical system by a factor of approximately four to six times, thereby providing an overall range in the magnification factor of approximately 16 to 36 times. A zoom optical group of lenses is disposed along an outer edge of the upright member in a linear arrangement. A fiber optic gyroscope is used to determine the direction of point of the telescope and is attached to the base member proximate the primary mirror.

DETAILED DESCRIPTION OF THE INVENTION

Figure 1:
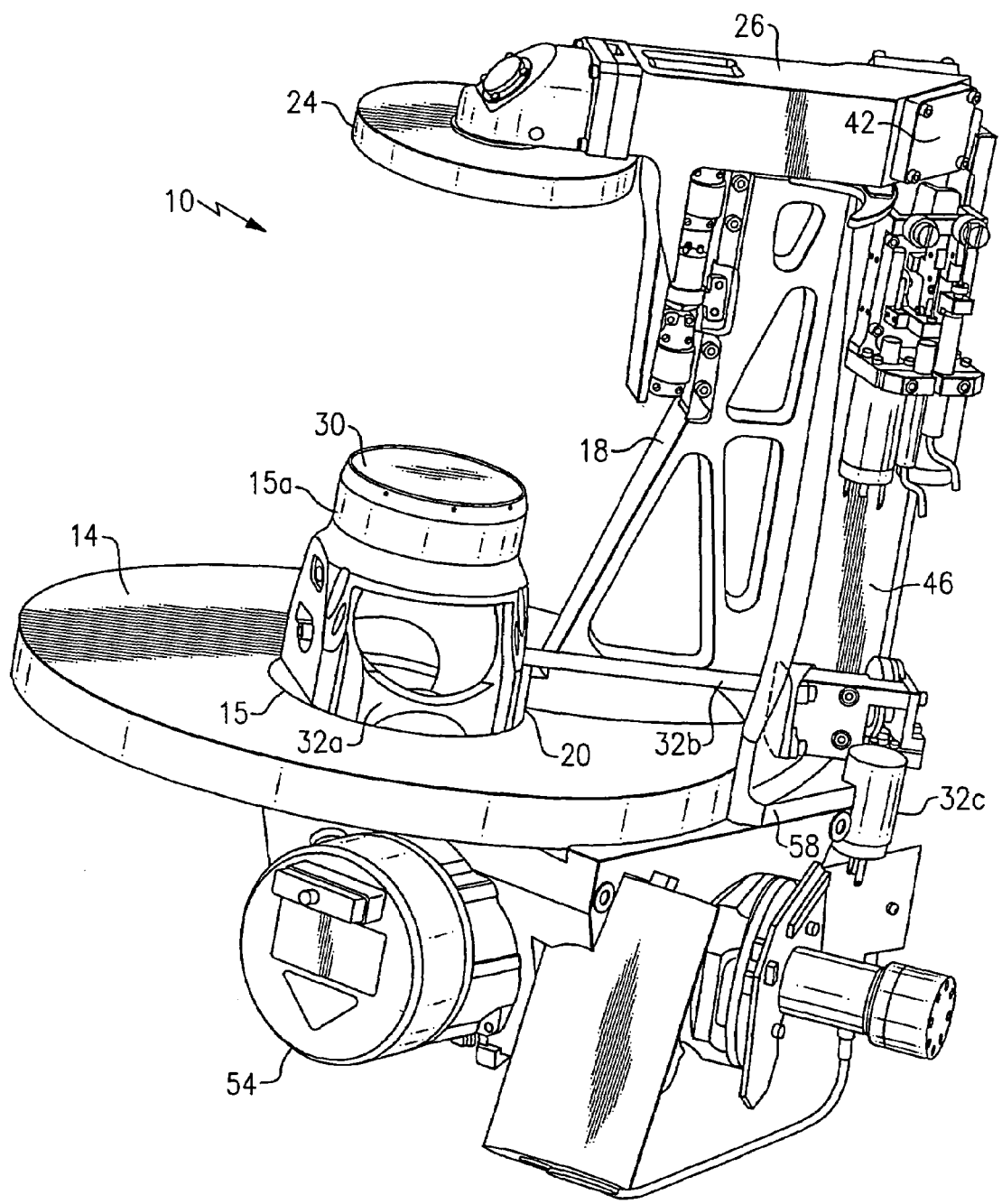
FIG. 1 is a view in perspective of a structure for supporting a visible and infrared telescope.
Figure 2:
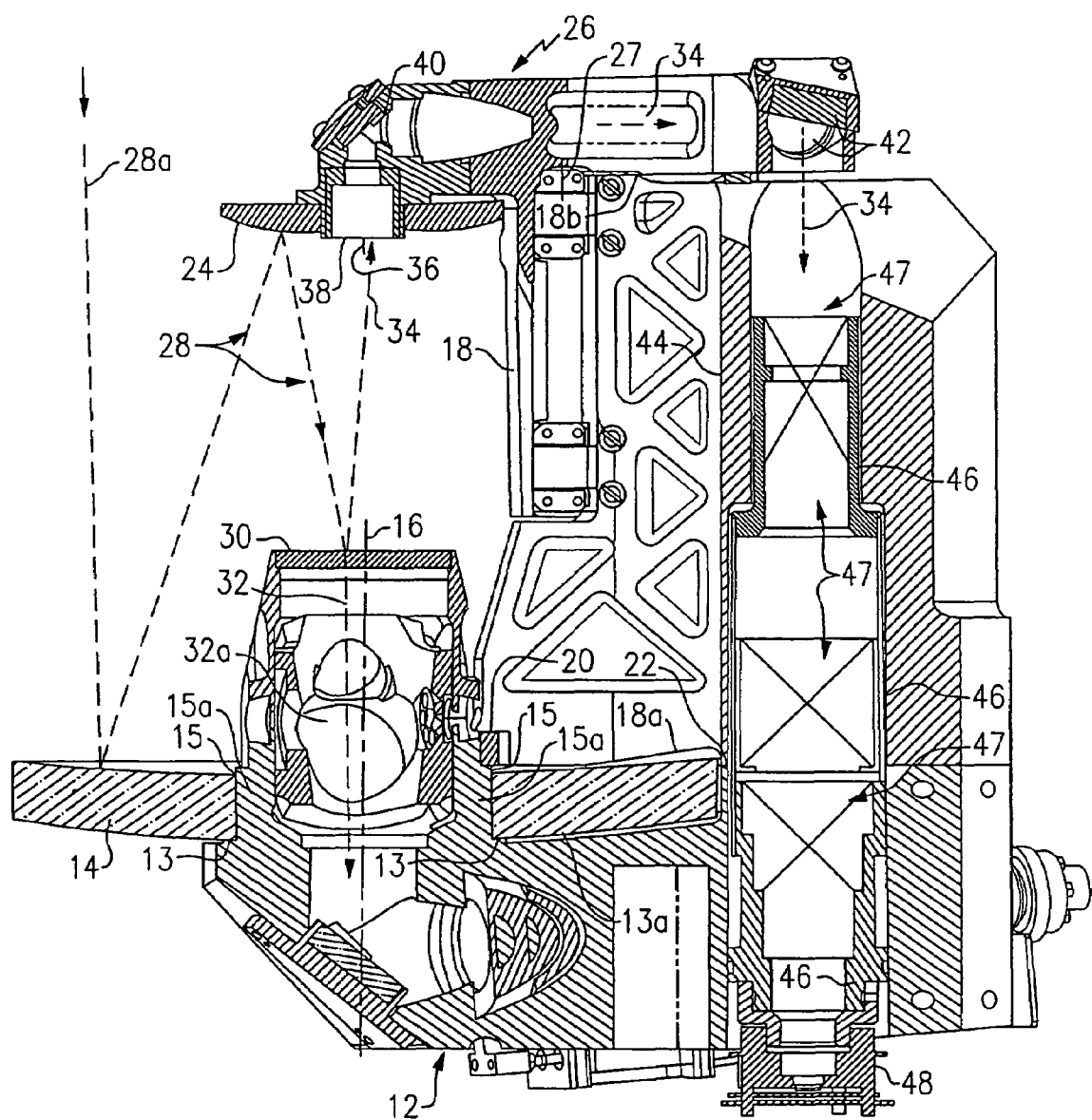
FIG. 2 is a cross sectional view of the structure of FIG. 1.

Referring on occasion to all of the figure drawings and now momentarily to FIG. 1 and also to FIG. 2 is shown, a structure for supporting an optical telescope, identified in general by the reference numeral 10.

A base assembly, identified in general by the reference numeral 12, supports the essential component parts of the telescope 10.

A large primary mirror 14 gathers substantial incident radiation thereby providing a large aperture for the telescope 10 in a compact structure. The primary mirror 14 includes a center aperture 15 that includes a diameter sufficient to clear an upper portion 15a of the base 12. The primary mirror 14 rests directly on the base assembly 12 on a support ring 13 that provides a circle of support that is proximate the center aperture 15.

A gap 13a exists intermediate the base assembly 12 and the primary mirror 14. Therefore, the only support for the primary mirror is provided by the ring 13 that extends around the center aperture 15.

The primary mirror 14 is attached to the base assembly 12 by any method that is desired, typically by the use of an adhesive. Accordingly, the primary mirror 14 is adhered to the ring 13.

The center aperture 15 includes a center longitudinal axis 16 (shown in dashed line) that passes vertically through the center of the primary mirror's 14 aperture 15.

An upright member 18 includes a first end 18a and an opposite second end 18b. The first end 18a is attached to the base assembly 12 at a first location 20 and at a second location 22. The first location 20 is located inside the aperture 15. The second location 22 is located outside (i.e., beyond) the circumference of the primary mirror 14 (see FIGS. 2 and 7). Attachment of the upright member 18 to the base 12 at the first and second locations 20, 22 is by a plurality of threaded screws (not shown) or any other preferred method.

Figure 4:
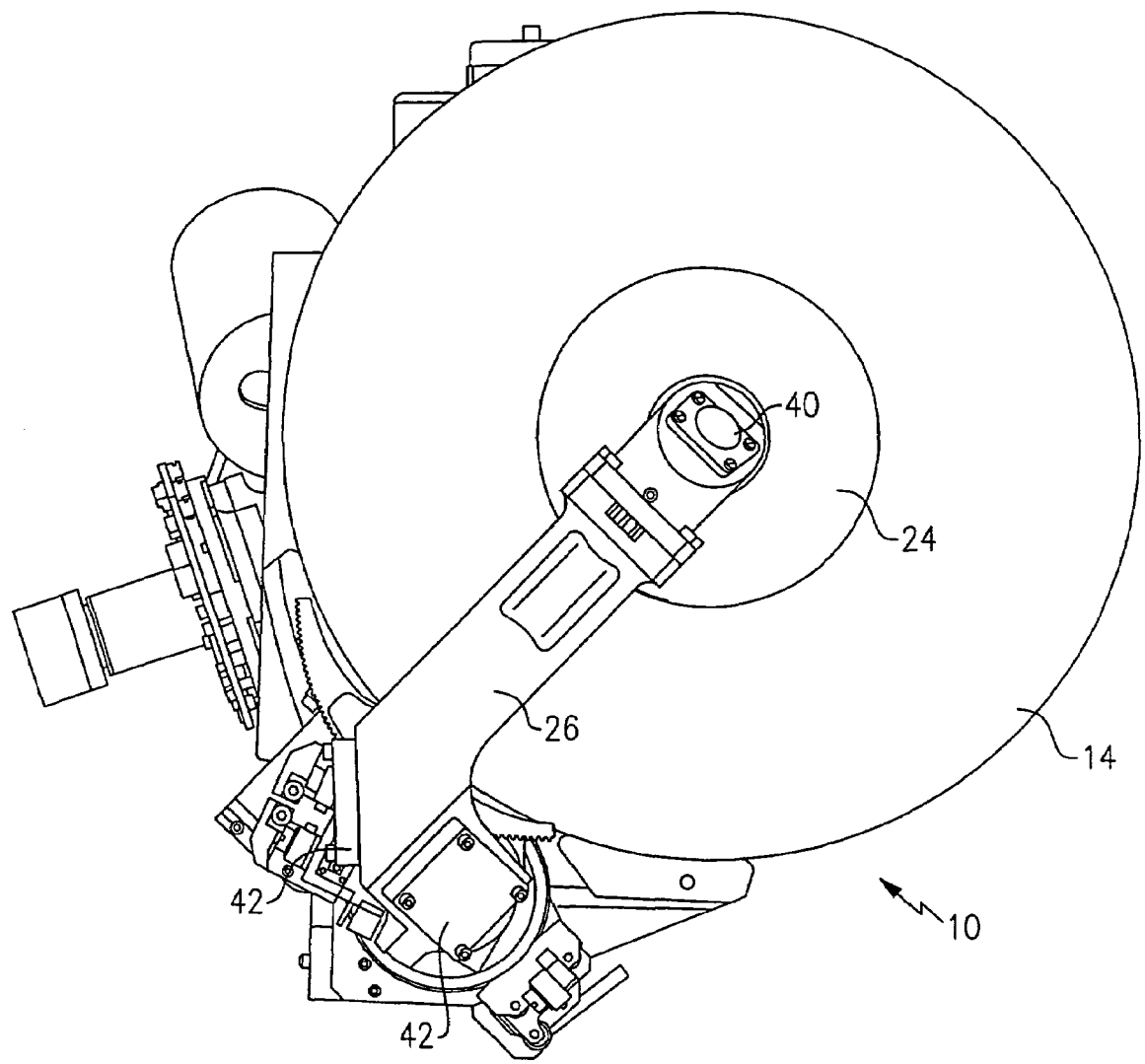
FIG. 4 is a top view looking down along a center longitudinal axis of the primary mirror with the secondary mirror in the optical path.

Accordingly, the upright member 18 is supported on two opposite sides (i.e., the first and second sides 20, 22) at the first end 18a. This provides maximum support and rigidity. The upright member 18, because it is supported both inside the aperture 15 and beyond the circumference of the primary mirror 14, is optimally thin (which blocks a minimum of incident radiation on the primary mirror 14) while also being maximally rigid. See FIG. 4.

This provides far superior performance as compared to a prior art "C" shaped bracket (not shown) that extends around a prior art type of a primary mirror (not shown) and toward its center. Such a bracket is subject to flexing and therefore to distortion of any image because of the variability of the optical path.

A further prior art limitation is that the size of the prior art primary mirror is limited in diameter as well. The larger the prior art primary mirror, the larger the "C" shaped bracket would have to extend inward, thereby increasing the moment arm and further increasing the tendency to flex, vibrate, or distort in accordance with minor temperature fluctuations.

The primary mirror 14 of the instant invention can be as large (or as small) as is desired. The larger in diameter it is, the further apart the two opposite sides (i.e., the first and second sides 20, 22) will be disposed, thereby adding rigidity as the diameter of the primary mirror 14 increases, instead of lessening it, as was the case with the prior art. This is an especially important and unexpected benefit that is provided by the instant invention.

A still further limitation of the prior art design is that for any given mechanical configuration, the only way to make the "C" shaped bracket stronger is to make it larger. This adds weight and also increases the size of the bracket which further tends to obstruct incident radiation from reaching the prior art primary mirror. The "footprint" of the upright member 18 over the primary mirror 14 is small and negligible. Accordingly, very little light energy is lost. See FIG. 4.

This further contributes another unexpected benefit of providing a maximum aperture (i.e., light gathering ability) in as compact and lightweight a structure as is possible. Furthermore, the upright member 18, being supported on both the first and second sides (20, 22) of the first end 18a thereof, substantially reduces or otherwise eliminates any flexing, thermal expansion, and harmonic vibration effects.

This arrangement also allows for the primary mirror 14 to be manufactured using well known, cost effective techniques. The use of the center aperture 15 is well known in the telescopic arts.

Attachment of the upright member 18 to the base 12 at the two opposite sides (i.e., the first and second sides 20, 22) of the first end 18a, the first side 20 being inside the aperture of the primary mirror 14 and the remaining second side 22 being beyond the outer circumference of the primary mirror 14 (i.e., outside the primary mirror 14) is new and provides the benefits herein described.

Figure 7:
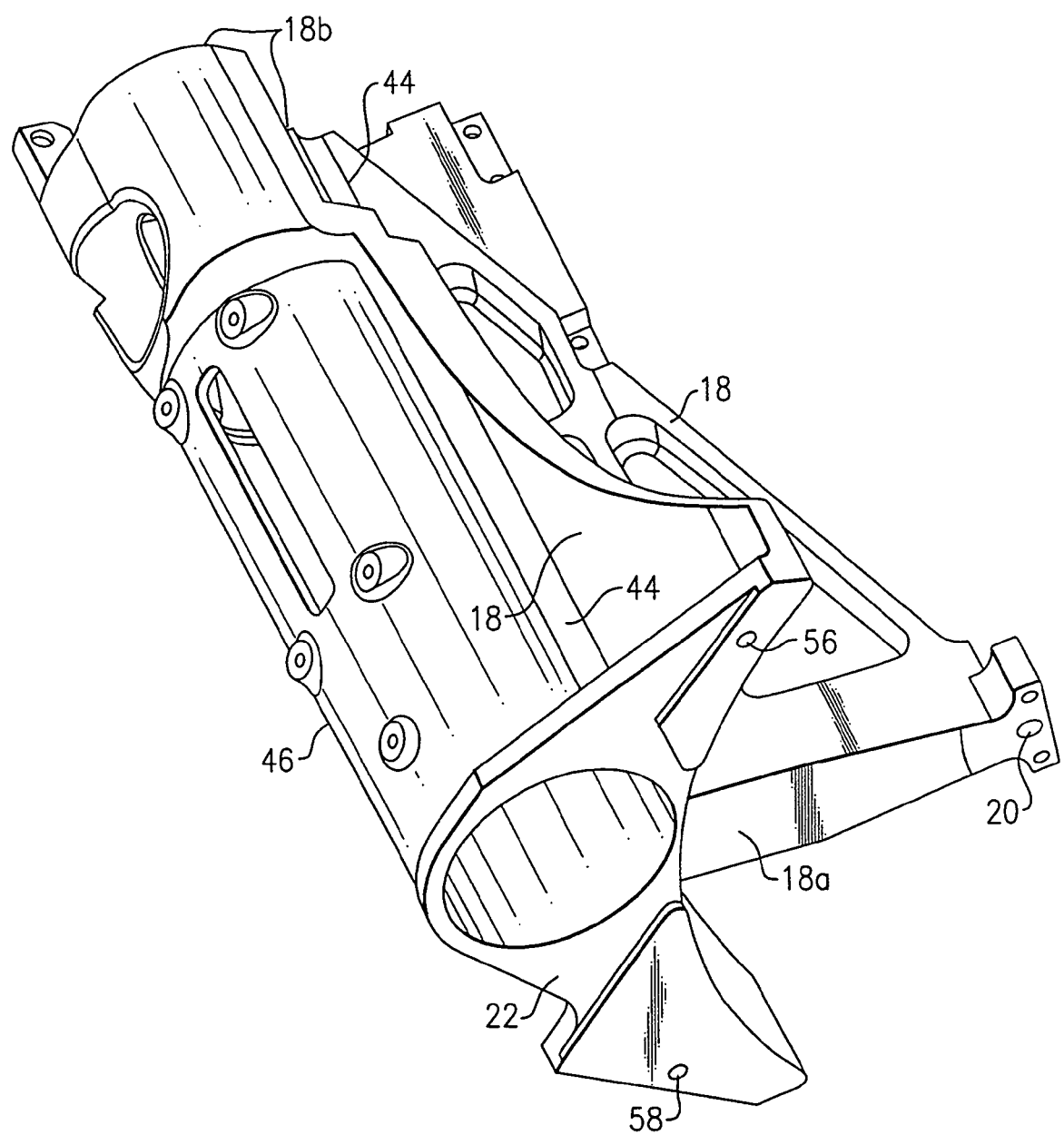
FIG. 7 is a view in perspective of an upright member of the structure for supporting a visible and infrared telescope of FIG. 1.

However, it is both possible and preferable to provide even greater support for the upright member 18 and the manner by which this is accomplished is described hereinafter. Accordingly, a preferred construction of the first end 18a of the upright member 18 is discussed in greater detail hereinbelow and as is shown in FIG. 7.

A secondary mirror 24 is attached to a turret assembly, identified in general by the reference numeral 26. The turret 26 is attached to the second end 18b of the upright member 18. The turret 26 is adapted to pivot about an axis 27 (FIG. 2) from a first position in which a center of the secondary mirror 24 aligns with the center longitudinal axis 16 (See FIG. 4) into a second position in which the center of the secondary mirror 24 does not align with the center longitudinal axis 16 (See FIG. 5).

In the first position, the turret 26 and the upright member 18 (disposed under the turret 26) obstruct a minimum of light energy.

As shown in FIG. 2, in the first position, a first optical path (shown in general by arrow 28) is provided in which incident light 28a that strikes the primary mirror 14, is reflected to the secondary mirror 24 and down to a dichroic beam splitter 30 that is disposed on the upper portion 15a and elevated over the center aperture 15 of the primary mirror 14.

The dichroic beam splitter 30 divides (or splits) the first optical path 28 into a first secondary optical path (shown by arrow 32) that passes through the beam splitter 30 and through the center aperture 15 and into a second secondary optical path (shown by arrow 34) that is reflected up off of the beam splitter 30 and through a second center aperture 36 of the secondary mirror 24.

The dichroic beam splitter 30 is a band pass filter that allows longer wavelengths of light in the infrared spectrum to pass through the beam splitter 30 along the first secondary optical path 32. The beam splitter 30 appears, essentially, as a mirror to the shorter wavelengths of light. Therefore, the shorter wavelengths of light comprising the visible spectrum and beyond are reflected off of the beam splitter 30 along the second secondary optical path 34.

Additional optical groups and elements are disposed along the first secondary optical path 32 as shown. In particular an IR turret 32a includes a plurality of movable optical groups. The IR turret 32a is urged to rotate by a drive shaft 32b that passes through an opening provided in the upright member 18 proximate the first end 18a thereof. The drive shaft 32b is powered by an electrical motor 32c that is disposed outside the primary mirror 14.

Because the drive shaft 32b passes through the upright member 18 it does not affect the optical path in any way. The drive shaft 32b does not impede or diminish any of the incident light 28a.

The IR turret 32a rotates about a turret axis 32c and is adapted to move at least one optical element 32d into a position that is below the surface of the primary mirror 14. Placement of the optical element 32d below the surface of the primary mirror 14 provides a converging optical bundle having a low f number below the primary mirror 14.

Accordingly, the structure for supporting an optical telescope 10 allows for the placement of the optical element 32d below the primary mirror 14 in the optical field resulting in exceptional optical performance in a compact overall structure 10. As the IR turret 32a is rotated, additional optical elements (that are included as a part of the IR turret 32a) are also adapted to be rotated and disposed in the optical field below the primary mirror 14.

As is described in greater detail hereinafter, it is also important to note that the structure for supporting an optical telescope 10 always allows for simultaneous viewing (i.e., accessing) of at least two channels (i.e., bands) of light and that the infrared band through the center aperture 15 is always active regardless of the focal length that the structure for supporting an optical telescope 10 is set to.

The second secondary optical path 34 also includes optical elements 38 (lenses) that are disposed proximate the second center aperture 36. The second secondary optical path 34 continues inside of the turret assembly 26 contacting an angled mirror 40 (or other optical component) and passing longitudinally along the length of the turret assembly 26 arm where a pair of optical elements 42 further redirect the second secondary optical path 34 until it is now directed downward in a direction that is substantially parallel to that of a linear outside edge 44 of the upright member 18.

The second secondary optical path 34 enters into a linear tubular structure 46 that is attached to the upright member 18 at the linear outside edge 44. The tubular structure 46 contains numerous grouping of optical components (i.e., lenses), each grouping identified in general by the reference numeral 47, as shown, that provide the desired processing of the shorter, visible wavelengths. These optical groupings 47 typically will include zoom capability in visible wavelengths and a visible camera 48 to record that which is observed.

The zoom capability provided by the optical components in the groupings 47 in the tubular structure 46 preferably provide a progressive zoom capability, where exactly the desired degree of zoom is realized by progressively moving select elements of the optical groupings 47. The lenses used in each of the groupings 47 are selected to provide the specific performance that is desired.

Zoom is better than a step function for tracking in the visible spectrum in that any object of interest in the visible spectrum is always visible when zooming, whereas by way of contrast, the object disappears from view momentarily when "stepping" from one focal length (magnification) to another focal length (magnification) and it must then be re-acquired which can be difficult as it will not look the same (it will be either larger or smaller or only a portion of it may be visible) which can impede identification and rapid re-acquisition.

In order to achieve the desired visible zoom capability with a high quality optical arrangement, it is necessary to arrange the optical components of each grouping 47 along a relatively long linear path so that certain of the components in each grouping 47 (i.e., lenses and/or groups of lenses) can be moved longitudinally to affect the field of view (i.e., to zoom in or out). Moving lenses or groups of lenses within a tube (i.e., as in the linear tubular structure 46) to vary the focal length (i.e. to provide zoom capability) is generally known.

The long linear outside edge 44 of the upright member 18 provides the unexpected benefit of providing a location where a linear grouping of the optical components 47 can occur. The tubular structure 46 is preferred because a cylindrical shape adds even more rigidity and strength to the upright member 18 to resist motion in any direction.

The first and second secondary optical paths 32, 34 and of course, the first primary optical path 28 features a long focal length (i.e., greater magnification).

Figure 5:
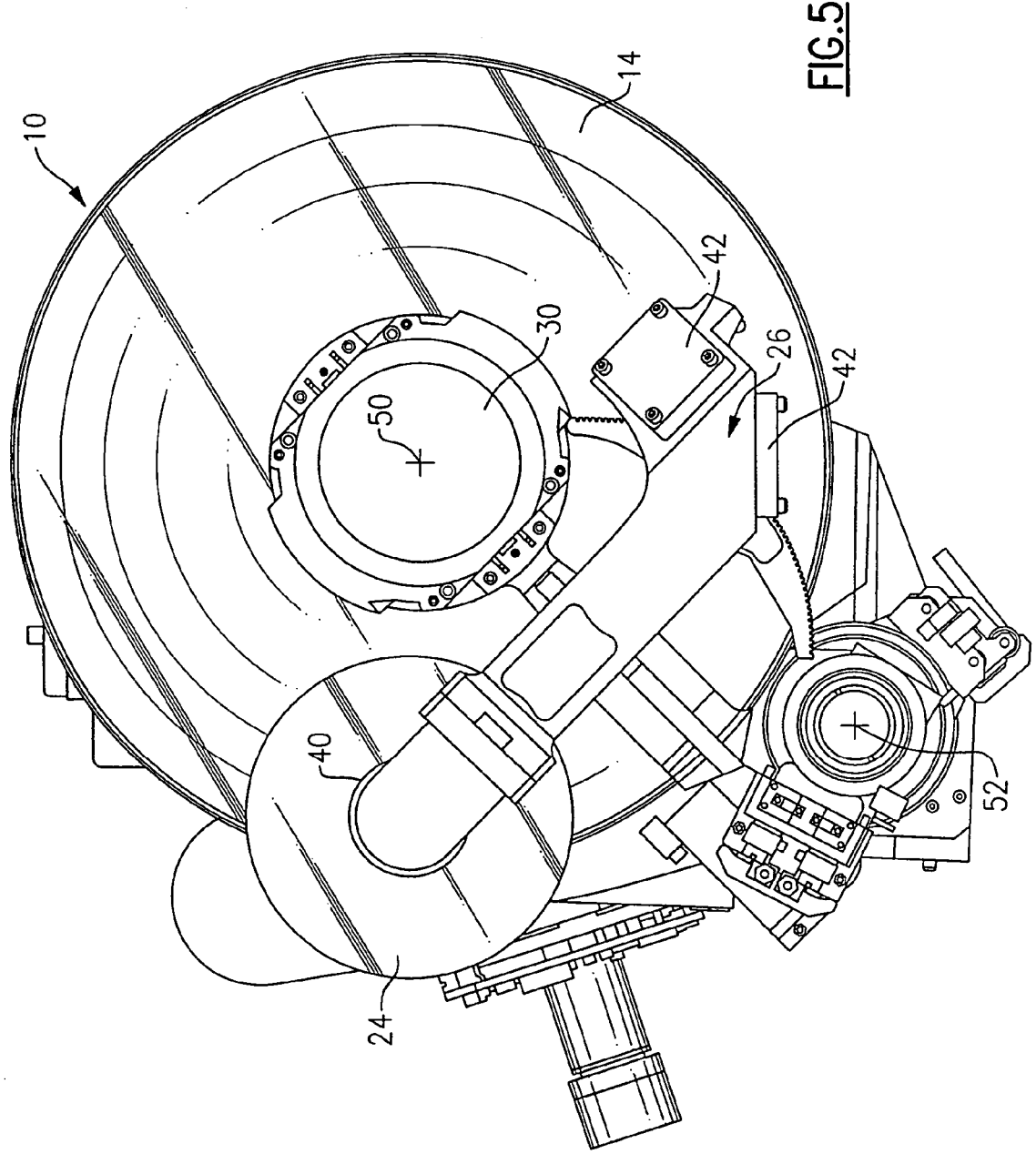
FIG. 5 is a top view looking down along a center longitudinal axis of the primary mirror with the secondary mirror out of the optical path.

The second position in which the turret 26 has been rotated so that the center of the secondary mirror 24 does not align with the center longitudinal axis 16 as shown in FIG. 5 provides a pair of second primary optical paths (as shown by arrow ends 50 and 52) that is open to receive ambient light and therefore features a short focal length (and wide field of view).

Arrow end 50 (FIG. 5) shows incident radiation striking the dichroic beam splitter 30. The longer wavelengths (infrared) pass through the beam splitter 30 along a path similar to that of the first secondary optical path 32 where they are optimally utilized by the optical element(s) 32d in the IR turret 32a.

Arrow end 52 shows incident radiation striking the optical components 47 that are disposed at the top of the tubular structure 46, which when in the second position of the turret 26, is open to ambient light 28a. The shorter wavelengths pass through the optical component groups 47 along a path similar to that of the second secondary optical path 34 where they are optimally utilized. Other wavelengths may also pass through the optical component groups 47 or they may be blocked by filters in the optical component groups 47, as desired.

In this mode (i.e., when the turret 26 is in the second position as shown in FIG. 5), the structure for supporting an optical telescope 10 has a wide field of view for both infrared and visible and can be used to scan for objects of interest simultaneously in both spectrums of light.

It is important to note that when the turret 26 is in either the first or second position, that two optical paths always remain active allowing for simultaneous two-channel viewing in both IR and visible.

Of course, depending upon how the structure for supporting an optical telescope 10 is to be used, it is possible to modify the components so that any of the optical paths (i.e., the first secondary optical path 32, the second secondary optical path 34 or either of the second primary optical paths 50, 52) can be configured to include any spectrum of light that is desired.

Figure 3:
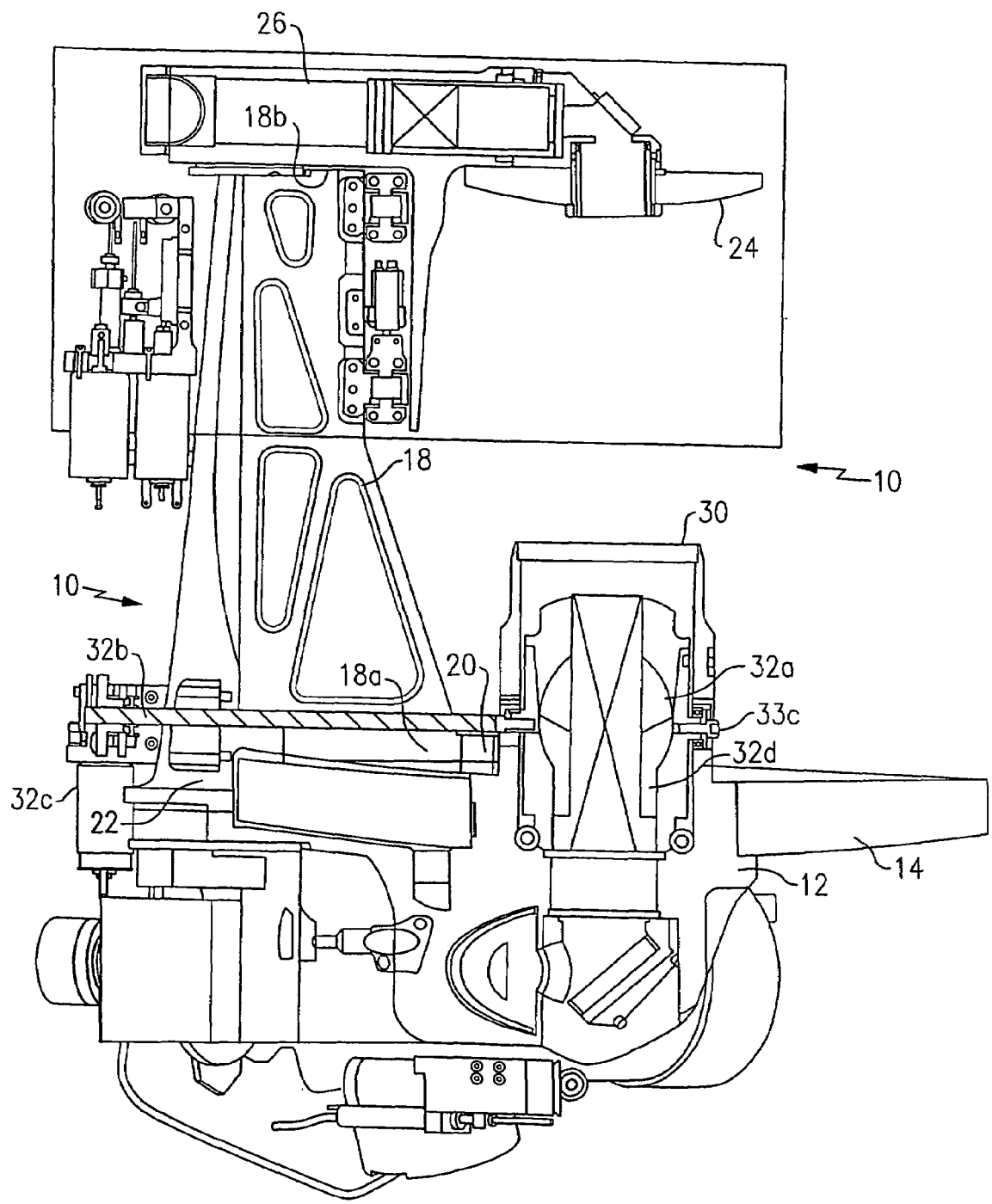
FIG. 3 is a cross sectional view of the telescope showing an upright member attached to a base structure at two locations.

It may be desirable to scan in a wide field of view, possibly looking for objects of interest in the infrared spectrum. When an IR source is detected, it may be desirable to engage in further observations in the visible spectrum, possibly zooming in. If more magnification is desired, it may desirable to rotate the turret 26 into the first position (i.e., the long focal length as shown in FIGS. 1, 2, and 3) and study the object closer (with even more magnification) in either or both the IR or visible spectrums, while again zooming in or out as desired in visible. The IR turret 32a allows for a stepped zoom capability in IR. Other optical components or groupings (not shown) can be added, if desired, along the first secondary optical path 32 to provide zoom in IR.

It is also very important to note that when the turret 26 is in the second position, the secondary mirror 24 is not disposed over the dichroic beam splitter 30, which is the aperture for shorter focal length (wide field of view) observations. This is extremely important because no energy is lost by impinging on any of the component parts of the turret 26 when it is in the second position, neither over the beam splitter 30 nor over the optical component groups 47 in the tubular structure 46.

It is also especially important to note that the turret 26 only places a single group of optical elements 38, 40 in the field of view. As it rotates it either places the single group of optical elements 38, 40 there or removes it from the field of view. This provides two important primary benefits.

First, there are no additional optical groups that may be disposed over the primary mirror 14 when it is actively being used which could lessen the amount of light striking the primary mirror 14. When the primary mirror 14 of the structure for supporting an optical telescope 10 is in use, the turret 26 and secondary mirror 24 provide minimum obstruction. This is because the turret 26 aligns with the upright member 18 when the turret 26 is in the first position.

The size of the turret 26 is preferably as close to that of the first end 18a of the upright member 18 (i.e., that portion of the upright member 18 that extends over the primary mirror 14) as is possible to either minimize or eliminate any additional loss of incident light 28a when the turret 26 is disposed in the first position.

Second, because the turret 26 does not have to introduce numerous optical groups into and out of the field of view, it is simple to include a reliable stop that ensures repeatability in the positioning of the turret 26 when the secondary mirror 24 and primary mirror 14 are in use and in alignment. When multiple optical groups are used (prior art), multiple stops are required that contribute to variability in positioning of the multiple optical groups.

Figure 6:
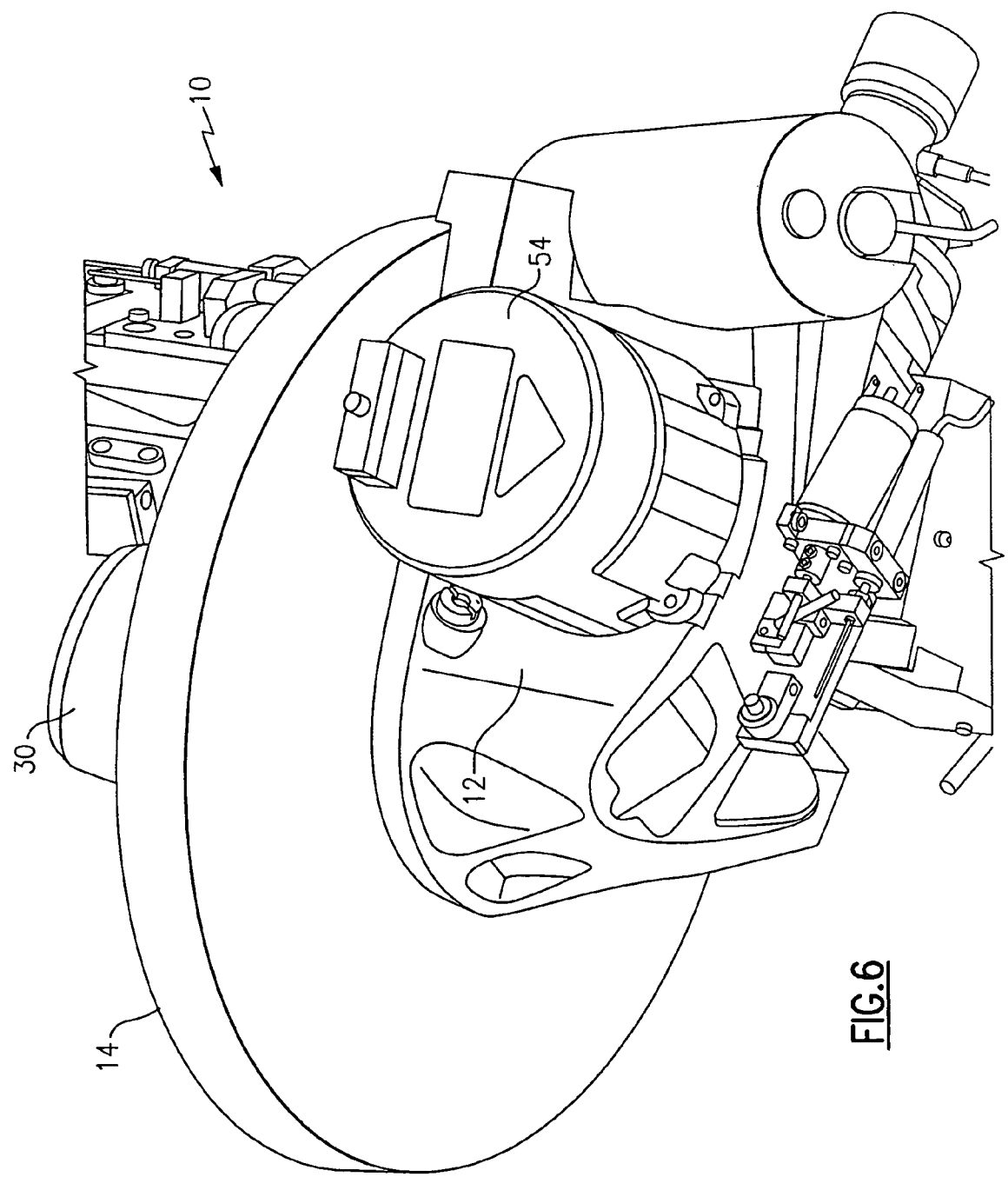
FIG. 6 is a view in perspective showing attachment of an IMU to the base structure of FIG. 3.

Referring now to FIG. 6, an IMU 54 is attached to the base assembly 12 proximate the primary mirror 14. The IMU 54 is attached immediately below the support ring 13 and is therefore as close to the primary mirror 14 as is possible. The IMU 54 provides an accurate reference in space as to where the primary mirror 14 is pointed (i.e., as to where it is looking). By attaching the IMU 54 to the base assembly 12, the physical distance between the gyroscope 54 and the primary mirror 14 is minimized. This contributes to optimum accuracy.

The IMU 54 typically includes three rate instruments and three accelerometers. The preferred rate instruments are fiber optic gyroscopes (FOGs). By attaching the primary mirror 14 on one side to the base 12 and by attaching the IMU 54 to the opposite side of the base 12, immediately adjacent to the primary mirror 12, the optimum correlation between where the primary mirror 12 is pointed and output information that is obtained from the IMU 54 is provided.

Accordingly, the output information from the IMU 54 can be used to provide a corrective signal to control circuitry which in turn generates a further corrective signal that is provided to any desired type of actuator that is adapted to move the structure for supporting an optical telescope 10 the proper amount to maintain the primary mirror 14 on point.

Mounting the gyroscope 54 to the same member (i.e., the base 12) that the primary mirror 14 is attached to provides the ultimate in tracking accuracy, not possible with prior art designs. This is because tolerances are minimized as are changes that can occur with temperature variations, etc.

Referring now also to FIG. 7 is shown the upright member 18 as seen by itself when viewed in perspective from the bottom (i.e., from the first end 18a). Of the two opposite sides 20, 22, the other side 22 that is located outside the primary mirror 14 preferably includes two distally located points 56, 58 of attachment to the base assembly 12.

The two points 56, 58 and the first location 20 provide three points of attachment of the upright member 18 to the base assembly 12. The three points 56, 58, 20 include openings that are used to bolt the upright member 18 to the base assembly 12. Together, the three points 56, 58, 20 form a tripod assembly that is exceptionally rigid and which resists motion of the upright member 18 in any direction.

Accordingly, the structure for supporting an optical telescope 10 provides unsurpassed precision and repeatability in maintaining all of the optical paths 28, 32, 34, 50, 52.

It is noted that as a result of having benefited from a description of the structure for supporting an optical telescope 10 including the optical paths disclosed herein, that other changes concerning any aspect of the structure 10 or of the optical elements are anticipated in order to adapt the structure for supporting an optical telescope 10 to optimally satisfy any particular requirement(s). For example, the structure for supporting an optical telescope 10 can be scaled to any size that is desired and it is expected to provide substantial benefits accordingly.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An improvement to an optical telescope that includes a first optical path and a second optical path, said first optical path including a first wavelength of light and said second optical path including a second wavelength of light and wherein said second wavelength is different than said first wavelength, and wherein at least one optical group is adapted to be inserted into either said first optical path or into said second optical path and removed therefrom, wherein the improvement comprises:

maintaining said first wavelength of light in said first optical path and maintaining said second wavelength of light in said second optical path when said at least one optical group is inserted into either said first optical path or into said second optical path and maintaining said first wavelength of light in said first optical path and maintaining said second wavelength of light in said second optical path when said at least one optical group is removed from either said first optical path or from said second optical path, and wherein said first optical path includes visible light and wherein a secondary mirror is inserted into said first optical path or removed therefrom as said at least one optical group, and wherein when said secondary mirror is inserted in said first optical path, said visible light is reflected off of said secondary mirror as part of said first optical path, and wherein when said secondary mirror is removed from said first optical path said visible light is not reflected off of said secondary mirror as part of said first optical path; and including a primary mirror and an upright member, wherein said upright member includes a bottom first end and an upper second end, and wherein said bottom first end of said upright member is attached to a base assembly at a first location and at a second location and wherein said first location is disposed inside an aperture that is provided in said primary mirror and wherein said second location is disposed beyond a circumference of said primary mirror, and including a turret assembly and wherein said turret assembly is pivotally attached to said upper second end of said upright member, and wherein said secondary mirror is attached to said turret assembly and wherein said turret assembly urges said secondary mirror into or out of said first optical path.

2. The improvement of claim 1 wherein said first wavelength includes visible and said second wavelength includes infrared and wherein said second wavelength includes light that has a wavelength from three to five microns in length.

3. The improvement of claim 1 wherein said first wavelength includes near infrared and said second wavelength includes infrared and wherein said second wavelength includes light that has a wavelength from three to five microns in length and wherein said first wavelength includes light that has a wavelength from 0.4 to 1.2 microns in length.

* * * * *